Patented Feb. 13, 1934

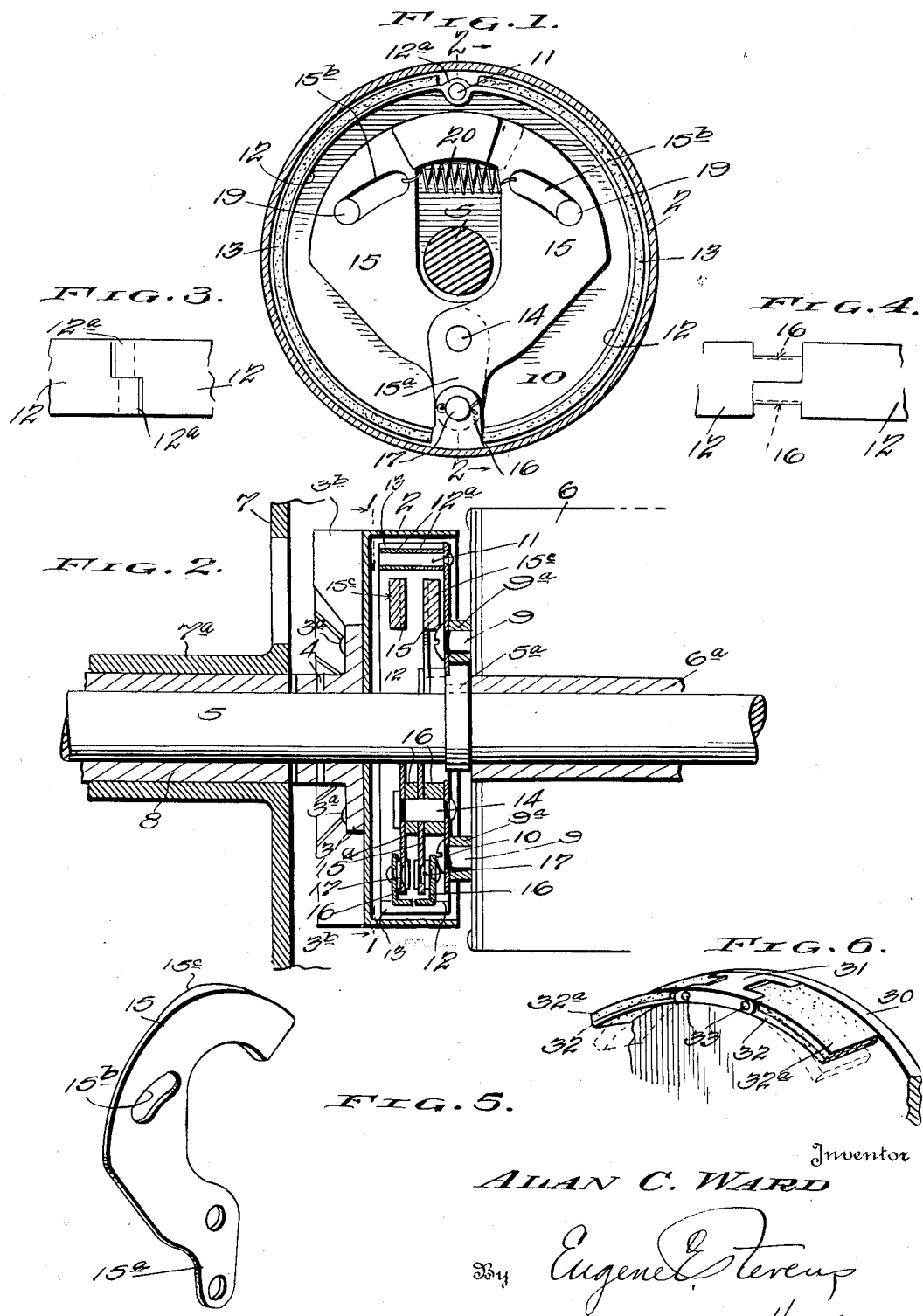

1,946,824

UNITED STATES PATENT OFFICE 1,946,824

CENTRIFUGAL CLUTCH

Alan C. Ward, Ada, Ohio, assignor to W. C. Ward, Warren, Ohio

Application May 1, 1931. Serial No. 534,429

7 Claims. (Cl. 192—105)

My invention relates to improvements in clutches and the like,—having particular reference to a clutch for use in connection with an electric motor to aid in starting the same under non-load conditions and gradually effecting the application of the load to the motor as it picks up speed,—it being understood, of course, that the invention is susceptible of other uses.

Briefly stated, the invention has for one of its primary objects to provide a device of this kind which is entirely automatic in operation, simple and economical in construction, strong, durable and unlikely to get out of order,—the nature of the design being such that it may be made in small sizes and readily installed.

Speaking more in detail, the invention has for an object to provide a clutch comprehending oppositely acting centrifugal weights mounted on the same center and about a driven shaft, the member carrying the weights also swingably supporting a pair of friction members adapted to be actuated into driving engagement with the member on the driven shaft through the action of the weights.

Another object of the invention is to provide in connection with a clutch, for a motor, a novel fan adapted to serve for cooling the motor.

Another object of the invention is to provide, in an automatically operating clutch, weights, and means for effecting mounting and guiding the same so that they will occupy a mninum of space about a shaft.

The invention also resides in certain novel features of construction, combination and arrangement of parts, and in certain modes of operation,—all of which will be readily apparent to those skilled in the art upon reference to the following description in connection with the accompanying drawing forming a part of this specification.

It is to be understood that the disclosures herein depict what now appears to be a preferred form of the invention. However, it will be understood that the invention is susceptible of other mechanical expressions within the spirit and scope of the subject matter claimed hereinafter.

In the drawing, wherein the same reference characters have been used to designate the same parts in all views,—

Figure 1 is a sectional view taken on the line 1—1 of Figure 2 and showing the weights and friction-surfaced shoes in elevation;

Figure 2 is a sectional view taken on the line 2—2 of Figure 1;

Figure 3 is a fragmentary plan view showing the pivoted ends of the shoes;

Figure 4 is a fragmentary bottom plan view of the opposite ends of the shoes which are connected to the weights;

Figure 5 is a perspective view of one of the weights; and

Figure 6 is a fragmentary perspective view of a modified form of shoe support.

Referring to the drawing by reference characters, numeral 2 designates a cup-like member which may be made from a stamping or casting but which is preferably of metal. The cup-like member 2 has a central hole in its bottom for the passage of a driven shaft 5, upon which there is the flanged sleeve 3 which is riveted, as at 3ª or otherwise secured, to the bottom of the cup-like member 2 for mounting the same upon the shaft 5. It will be noted that a suitable key or pin such as 4 is used to rigidly mount the sleeve 3 upon shaft 5.

The invention is here illustrated in connection with an electric motor of which only a sufficient portion is shown to illustrate the application of my invention. For instance, 7 designates the frame of the motor, while 6 designates the rotor having the hub sleeve or bearing 6ª loosely mounted on the shaft 5,—there being a shoulder 5ª of the shaft to limit axial movement of the rotor 6.

The frame portion 7 of the motor is provided with a bearing 7ª for the shaft 5 and, as shown, this bearing 7ª is provided with a liner or bushing 8 against which the end of the sleeve 3 is designed to approach as indicated in Fig. 2.

It is also important to observe that the sleeve member 3 has its disk portion carrying a multiple blade fan 3ᵇ, as clearly shown in Fig. 2, for the purpose of assisting in cooling the motor parts within the casing 7. Thus, the sleeve 3 serves a dual function.

In further carrying out the invention, it will be noted from Fig. 2 that the rotor 6 is provided with studs 9 adapted to spacedly carry the plate 10 which is of disk-like form. Sleeves 9ª about the studs 9 serve to space the disk-like plate 10 from the end of the rotor 6, the studs 9 being shown as headed machine screws, although any other satisfactory equivalent may be used.

The plate 10 has a medial hole through which the shaft 5 passes, and at one side of the shaft the plate 10 is provided adjacent its outer edge with a post 11, which pivotally engages the bearings 12ª at one end of the substantially semi-circular shoes 12 which extend about the shaft in opposite directions and adjacent the flange of the cup 2.

The shoes 12 have their outer surfaces covered with cork, asbestos, or any desired friction material.

At the opposite side of the shaft, the disk 10 has a post 14 for pivotally supporting the weights 15,—it being noted that the spacer collars 16 are employed about the post 14 to space the bearing portions of the weights 15 from each other and mount the disk 10.

Figures 1, 2 and 5 illustrate very clearly that the weights 15 are provided with short arm extensions at their lower ends beyond the post 14. These arms are designated at 15ª, and have pivotal connections, through rivets 17 or the like, with the upstruck ends 16 of the shoes 12. The manner in which these upstruck ends 16 of the shoes 12 are formed, is very clearly illustrated in Fig. 4.

Figures 3 and 4, which show the respective ends of the shoes 12, clearly indicate that in each instance the shoes are reduced in width at the ends. In Fig. 3, this reduction is made so that the composite twin bearings, 12ª, 12ª, will occupy no more space than the width of one of the shoes. Correspondingly, in Fig. 4, the shoes are reduced in width and one edge of the reduced portion is turned up to form, in the fashion shown, the bearing flanges 16.

From the description, it will be manifest that when the rotor 6 is started, the weights 15 will be swung outwardly through centrifugal action. This results in the lower ends 15ª of the weights throwing the lower ends of the shoes 12 apart so as to bring the friction surfaces thereof into engagement with the flange of the cup 2 which is fast on the shaft 5. Obviously, the rotor sleeve 6ª, is loose on shaft 5.

As the rotor picks up speed, the pressure engagement of the frictioned surfaces of the shoes 12 with the flange of cup 2 will increase. Thus, the load will be gradually picked up.

As clearly illustrated in Fig. 1, I provide the disk 10 with guide pins 19 extending into arcual slots 15ᵇ in the weight 15 for the purpose of guiding the same and limiting their movement. A spring 20 is preferably connected to the opposed weights so as to tend to hold them together so that the rotor 6 will start substantially without any load.

From the foregoing description and statement of operation, it is believed that the advantages of my invention will be readily apparent to those skilled in the art. Obviously, the parts can be readily manufactured and easily installed. I have chosen to illustrate the friction material 13 on the shoes 12. Clearly, however, there would be no invention in placing this material upon the inner surface of cup flange 2. An important item is the compact feature of the device which enables it to be applied in a very limited space, as shown between the rotor 6 and the motor frame 7.

Figure 6 illustrates a modified mounting means for the shoes. Here shoes 32 (corresponding to 12, Figure 1) may have tongues pivoted upon separate shafts or the like 33 carried by oppositely notched bracket 31 of the driven disk 30 (which is the driven disk 10 of Figure 2).

The clutch shoes 12, as will be obvious, will engage flange 2 regardless of the direction of rotation of disk 10, and will not disengage even at abnormally high speeds.

Having thus described my invention, what I claim as new and desire to secure by Letters Patent is:

1. In a centrifugal clutch for establishing driving connection between adjacent rotatable members, a plate carried by one of said members, a cup-like member rigidly secured to the other member, said plate being disposed within the confines of said cup flange, a post carried by said plate member at one side of said shaft and adjacent the flange of said cup, oppositely extending laterally swinging arcuate shoes journalled upon said post at their adjacent ends, and being disposed adjacent and within the flange of said cup, weights disposed about said shaft, a second post carried by said plate at the opposite side of said shaft and remote from said first post and pivotally supporting said weights, said weights having substantially alined actuating arms adjacent said last mentioned post, and extending radially beyond said post toward the adjacent portion of the flange of said cup, each of said shoes having its free end provided with upstruck bearing portion, the upstruck bearing portions of said shoes being disposed in substantial alinement and in overlapping relation with the end portions of said actuating arms, each actuating arm being pivoted to one of said upstruck portions, and friction material interposed between said shoes and the flange of said cup.

2. The combination set forth in claim 1, and the upstruck bearing ends of said shoes being of reduced width with their adjacent edges substantially contiguous.

3. A clutch for establishing a driving connection between adjacent rotatable members and comprising a plate carried by one of said members and a flanged cup carried by the other of said members, laterally swingable shoes adjacently pivoted to said plate and movable in a plane parallel thereto and adapted to engage the flange of said cup, a pair of centrifugally acting weights pivoted upon said plate at a point remote from said shoes, and adapted for movement about a common axis, said weights having alined actuating arms extending beyond said pivot, the shoes having edgewise overlapping and cutaway free end portions providing alined upstanding ears, and said arms being pivoted to said shoe ears whereby to force the shoes into engagement with the cup flange.

4. A clutch for establishing a driving connection between adjacent rotatable members and comprising a plate carried by one of said members and a flanged cup carried by the other of said members, laterally swingable shoes adjacently pivoted to said plate and movable in a plane parallel thereto and adapted to engage the flange of said cup, a pair of centrifugally acting weights pivoted upon said plate at a point remote from said shoes, and adapted for movement about a common axis, said weights having alined actuating arms extending beyond said pivot, the shoes having edgewise overlapping and cutaway free end portions providing alined upstanding ears, and movement limiting guide means for said weights in part formed thereby and in part carried by said plate at a point adjacent said shoe pivot means.

5. In a centrifugal clutch including a rotatable support and an annular friction member adjacent thereto, a pair of oppositely extending arcuate shoes pivoted at adjacent ends to said support and movable to engage the friction member, a pair of centrifugally and oppositely acting weights pivoted to the support for movement about a common axis, alignable arms extending beyond said weight pivot and toward the free ends of said shoes, the free end of each shoe having a cut-out at one side and a laterally extending flange at the other, the cut-outs permitting the ends of the shoes to interfit, and a pivotal connection between the respective weight arms and shoe flanges for operatively connecting the weights and shoes.

6. In a centrifugal clutch including a rotatable support and an annular friction member adjacent thereto, a pair of oppositely extending arcuate shoes pivoted at adjacent ends to said support and movable to engage the friction member, a pair of centrifugally and oppositely acting weights pivoted to the support for movement about a common axis, alignable arms extending beyond said weight pivot and toward the free ends of said shoes, the free end of each shoe having a cut-out at one side and a laterally extending flange at the other, the cut-outs permitting the ends of the shoes to interfit, and a pivotal connection between the respective weight arms and shoe flanges for operatively connecting the weights and shoes, and movement limiting guide means for said weights in part carried thereby and in part carried by said support adjacent the shoe pivot.

7. In a centrifugal clutch including a rotatable support and an annular friction member adjacent thereto, a pair of oppositely extending arcuate shoes pivoted at adjacent ends to said support and movable to engage said friction member, a pair of centrifugally and oppositely acting weights pivoted to said support, said weights having normally aligned arms extending beyond said pivot toward the free ends of said shoes, the free ends of said shoes having bearing flanges disposed in overlapping relation with respect to the ends of said weight arms and to each other, said weight arms being pivoted one to each of said flanges, said shoe, weight and weight arm pivots being normally disposed in radial alignment with each other and with the axis of rotation of said support.

ALAN C. WARD.